C. B. DICKINSON.
CHECK-REIN GUARD.

No. 177,816. Patented May 23, 1876.

WITNESSES:
A. W. Almqvist
John Goethals

INVENTOR:
C. B. Dickinson
BY
Munn &c
ATTORNEYS.

UNITED STATES PATENT OFFICE.

CHARLES B. DICKINSON, OF BROOKLYN, NEW YORK.

IMPROVEMENT IN CHECK-REIN GUARDS.

Specification forming part of Letters Patent No. 177,816, dated May 23, 1876; application filed May 1, 1876.

*To all whom it may concern:*

Figure 1:
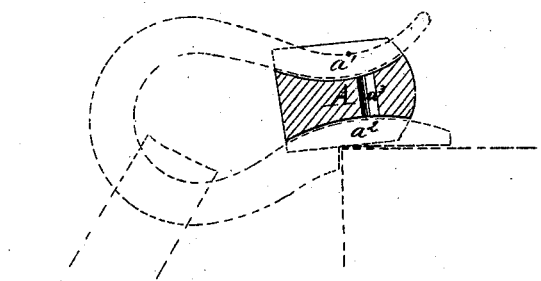
Figure 2:
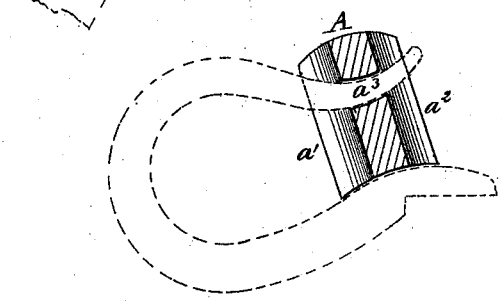
Figure 3:
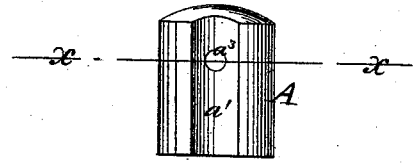
Figure 4:
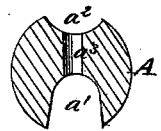

Be it known that I, CHARLES B. DICKINSON, of Brooklyn, in the county of Kings and State of New York, have invented a new and Improved Check-Rein Guard, of which the following is a specification:

Figure 1 is a longitudinal section of my improved device, illustrating its use. Fig. 2 is the same view as Fig. 1, but showing the device in another position. Fig. 3 is a side view of the device. Fig. 4 is a cross-section of the same, taken through the line $x\ x$, Fig. 3.

The object of this invention is to furnish an improved device for attachment to check-rein hooks, to prevent the check-rein from becoming accidentally unhooked, and which shall be so constructed that it may be applied to hooks of various styles with equal facility.

The invention consists in the rubber block, having a deep longitudinal groove in one side, a shallower longitudinal groove in the opposite side, and a hole formed through it near one end, to adapt it for use upon a check-rein hook, as hereinafter fully described.

A is a rubber block, which may be made cylindrical or of other desired form, and in one of its sides is formed a deep longitudinal groove, $a^1$. In the side of the block A, opposite the deep groove $a^1$, is formed a shallower longitudinal groove, $a^2$. In the block A, near one end, is formed a hole, $a^3$, as shown in the drawings.

In using the device, it is slipped between the base and end of the hook, and with the deep groove $a^1$ up or down, as the space between said base and end may require. Should the space between said base and end be very wide, the device is slipped into the cavity of the hook, is turned up into a vertical position, and is slipped back between said base and end; or the end of the hook may be passed through the hole $a^3$, with the short or the long end up, as the size of space between the base and end of the hook may require. In all these positions the elasticity of the rubber will hold the device securely in place. When not required for use, the driver can readily carry the device in his pocket, and can apply it to the hook in a minute when required.

Having thus described my invention, what I claim as new, and desire to secure by Letters Patent, is—

The rubber block A, having a deep longitudinal groove, $a^1$, in one side, a shallower longitudinal groove, $a^2$, in the opposite side, and a hole, $a^3$, formed through it, near one end, to adapt it for use upon a check-rein hook, substantially as herein shown and described.

CHARLES B. DICKINSON.

Witnesses:
JAMES T. GRAHAM,
T. B. MOSHER.